United States Patent [19]

Bose

[11] 3,760,599

[45] Sept. 25, 1973

[54] METHOD AND APPARATUS FOR CONTROLLING THE FLOWLIQUID

[76] Inventor: Robert N. Bose, 1015 Naperville Rd., Wheaton, Ill. 60187

[22] Filed: Aug. 2, 1971

[21] Appl. No.: 165,805

Related U.S. Application Data

[62] Division of Ser. No. 848,625, Aug. 8, 1969, Pat. No. 3,661,483.

[52] U.S. Cl............................ 62/49, 62/55, 137/114, 264/28
[51] Int. Cl. ............................................. F17c 13/02
[58] Field of Search ...................... 62/49, 45, 50, 51, 62/52, 55, 10, 514; 137/114; 264/28, 94, 98

[56] References Cited
UNITED STATES PATENTS

| | | | |
|---|---|---|---|
| 3,065,501 | 11/1962 | Gasmire............................ | 264/98 X |
| 3,520,020 | 7/1970 | Williams et al. .................... | 264/94 X |
| 3,534,753 | 10/1970 | Ollivier .................................. | 137/7 |

Primary Examiner—Meyer Perlin
Assistant Examiner—Ronald C. Capossela
Attorney—Fidler, Patnaude & Batz

[57] ABSTRACT

The intermittent flow of carbon dioxide liquid from a high pressure reservoir to a low pressure use area is controlled by a flow restricting orifice disposed in the supply line and a simple control valve located in the line downstream of the orifice. An additional source of pressurized fluid maintains the pressure between the orifice and the valve above the triple point of carbon dioxide to prevent solidification of the carbon dioxide upstream of the valve.

In a cyclical blow molding operation wherein liquid carbon dioxide is used to chill the freshly molded parts, the pressure of the fluid used to expand the parison is maintained above the triple point of carbon dioxide to prevent solidification of the carbon dioxide. Additionally, a predetermined amount of carbon dioxide is permitted to vaporize in the line upstream of the orifice during the off cycle in the molding operation thereby providing the necessary time delay between the application of the parison expending gas and the injection of the liquid carbon dioxide into the molded part.

8 Claims, 3 Drawing Figures

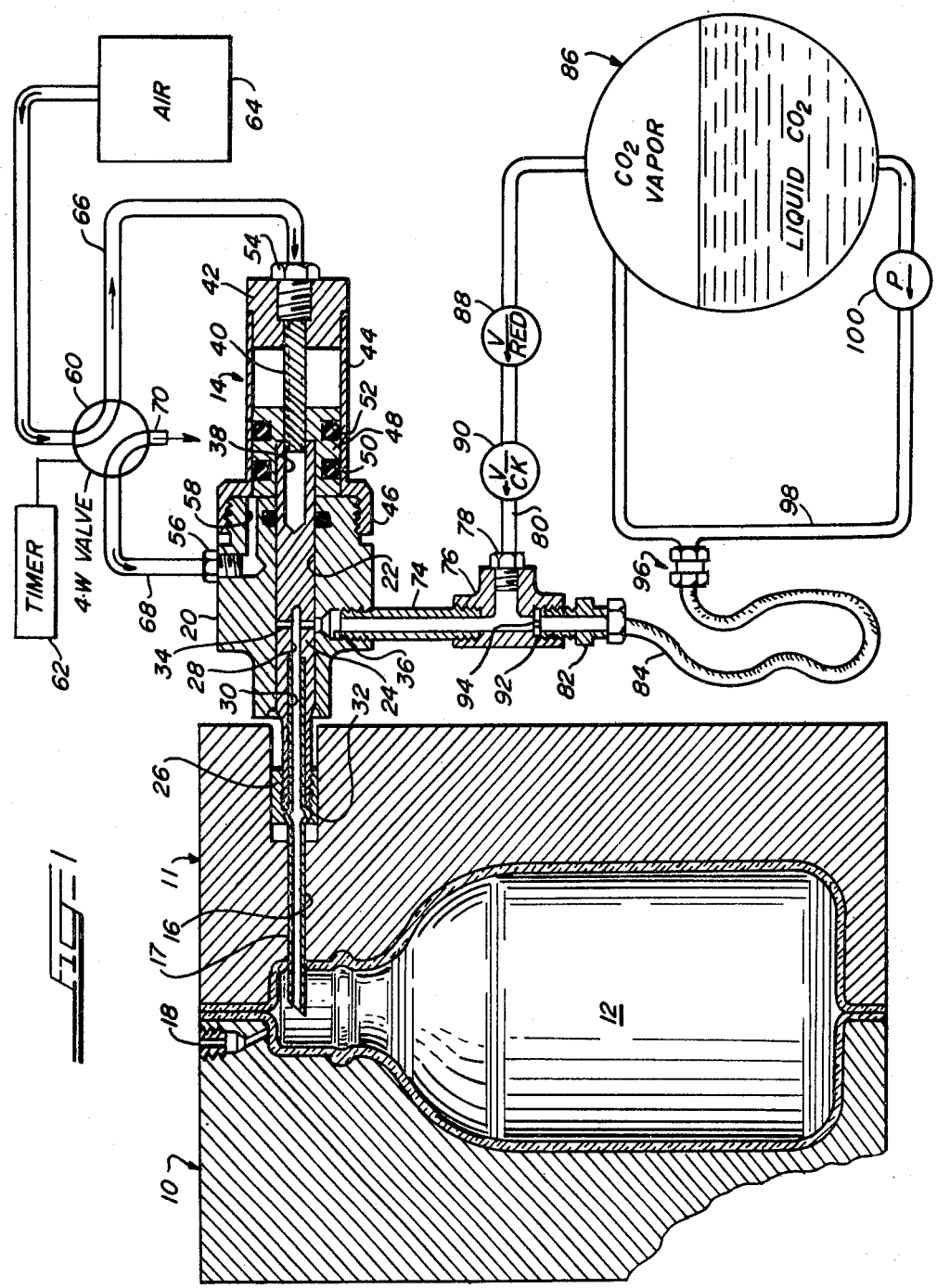

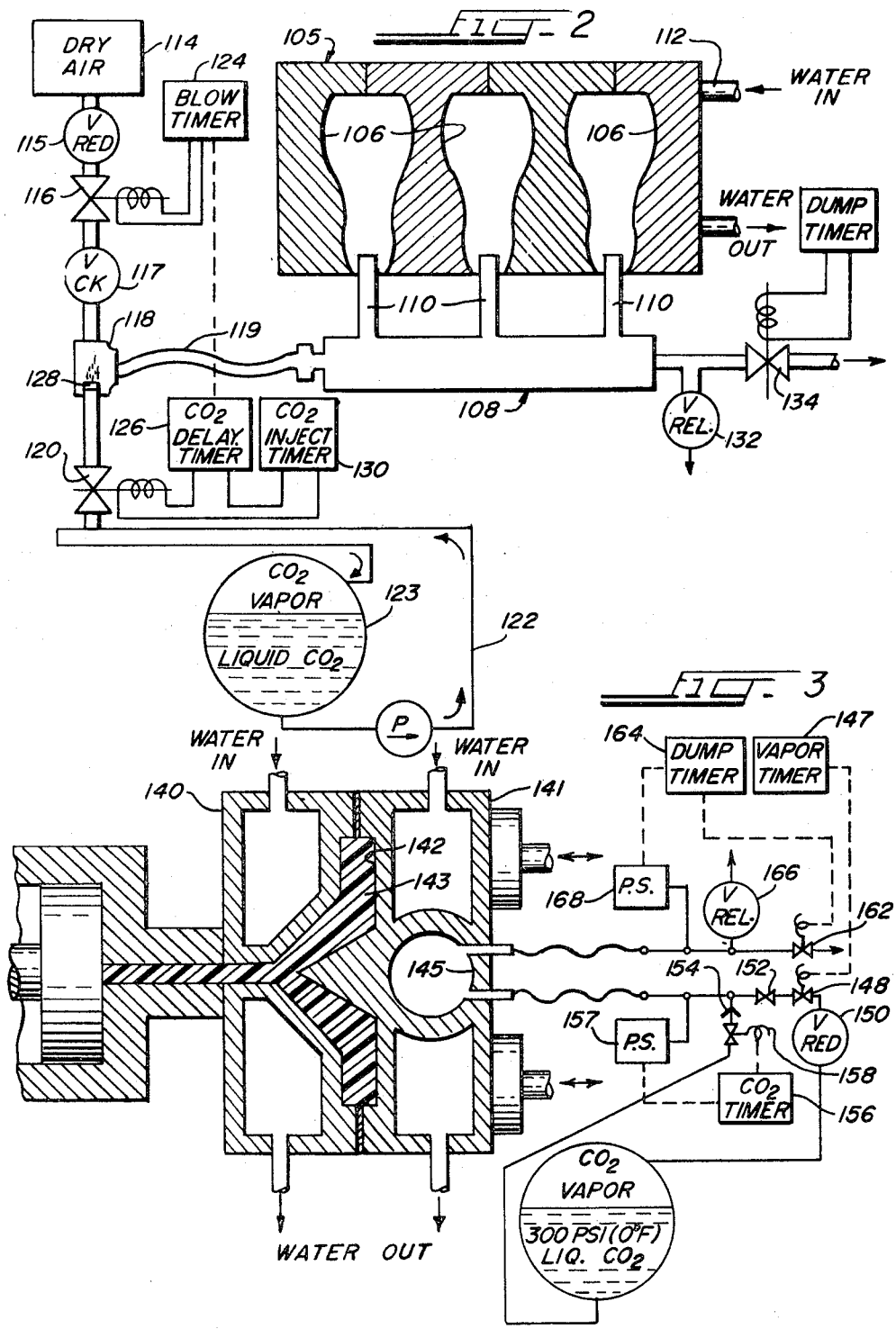

METHOD AND APPARATUS FOR CONTROLLING THE FLOWLIQUID

This is a Division of copending application Ser. No. 848,625, filed Aug. 8, 1969 now U.S. Pat. No. 3,661,483.

The present invention generally relates to a method and apparatus for controlling the flow of carbon dioxide or other volatile liquid between a high pressure reservoir wherein it is maintained in a liquid state and a low pressure use area at which it changes into the solid state, and it further relates to a new and improved method of molding plastic articles using carbon dioxide.

For many years blow-molded plastic articles have been chilled immediately after molding by injecting a small amount of liquid carbon dioxide into the cavity in the freshly molded part. Since the pressure in the cavity is well below the triple point of carbon dioxide, the liquid carbon dioxide changes from the liquid to the solid state within the part thereby quickly chilling the part and thus accelerating the molding cycle. A more complete description of this prior art system may be had by reference to U.S. Pat. No. 3,065,501 — Gasmire.

While this accelerated cooling system has been successfully and widely used, some problems have arisen in connection with the feeding of a precisely controlled amount of liquid carbon dioxide into the freshly molded part and in accurately controlling the time in the molding cycle when the carbon dioxide is injected into the part. Relatively complex installations including electric timers and expensive control valves have been used in these systems but even then freeze-ups in the lines have not been uncommon and variations in the amount of carbon dioxide fed to the parts occur.

In order to increase the use of carbon dioxide and other volatile cooling liquids, not only in the plastic blow-molding field, but in the plastics industry at large as well as for other uses, it is an object of this invention to provide a new and improved method and apparatus for accurately metering the flow of a pressurized volatile liquid, such as liquid carbon dioxide, to a low pressure use area.

Another object of this invention is to provide a new and improved method and means for controlling the flow of liquid carbon dioxide to a freshly molded part.

A further object of this invention is to provide a new and improved method and apparatus for blow-molding plastic articles.

Briefly, the above and further objects may be realized in accordance with the present invention by supplying liquid carbon dioxide through a small, flow restricting orifice upstream of a control valve and always maintaining the pressure between the orifice and valve above the triple point of carbon dioxide to thereby prevent the carbon dioxide from changing into a solid state upstream of the valve. Where a time delay between the opening of the control valve and the passage of liquid carbon dioxide therethrough is desired, means is provided upstream of the orifice to vaporize a predetermined amount of carbon dioxide in the line so that when the control valve opens, the carbon dioxide vapor must first pass or orifice before the liquid carbon dioxide can feed therethrough. Hence, an adjustable predetermined time delay is achieved without the use of timers or the like.

Further objects and advantages and a better understanding of the present invention may be had by reference to the following detailed description taken in connection with the accompanying drawings, wherein:

FIG. 1 is a partly schematic diagram showing the use of the present invention in a blow molding system;

FIG. 2 is a partly schematic diagram of a multiple cavity blow molding system embodying the present invention; and FIG. 3 is a partly schematic diagram of an injection molding system embodying the present invention.

Referring now to the drawings, and particularly to FIG. 1 thereof, there is shown a portion of a blow molding system which includes a pair of mold halves 10 and 11 which define therebetween a cavity 12 in the shape of the article to be molded therein. In the illustrated embodiment of the invention, the article 12 is a bottle. A vapor and liquid injection device 14 is mounted by suitable means, not shown, adjacent the mold part 11 and is used to inject a pressurized fluid into a hot tubular parison located within the mold cavity in order to inflate the parison against the wall of the cavity 12.

The manner in which the hot plastic parison is extruded and the mold parts 10 and 11 are brought together over it to seal off the top and bottom ends thereof is well known in the art. Once, however, the parison has been positioned within the mold cavity 12, the injection device 14 is actuated to insert a tubular needle 16 into the cavity within the parison and then a pressurized gas flows through the needle 16 into the parison thereby to expand it against the walls of the cavity. Pressure thereafter continues to build up within the molded article and ruptures it at the location of a vent line 18 in the mold half 10 which opens to the atmosphere and reduces the pressure in the article. Almost immediately thereafter a metered quantity of liquid carbon dioxide feeds through the needle 16 and upon entering the cavity in the freshly molded article it vaporizes and then changes into the solid state thereby absorbing a substantial amount of heat from the molded article and thus quickly chilling it. Thereafter, the injection device 14 is operated to withdraw the needle 16 from the article, and the mold parts 10 and 11 are opened to permit removal of the molded part.

The device 14 includes a body portion 20 which is bored at 22 to slidably receive a rodlike valve body 24 to which the needle is suitably affixed by means of a fitting 26 threaded onto the end of the valve member 24. As shown, the valve member 24 is provided with a longitudinal bore 28 which is counterbored at 30 to receive the rear end of the needle 16. The needle 16 is provided with an annular bead 32 which is received in a generally complementary groove in the fitting 26 so that when the fitting 26 is threaded onto the end of the rod, the needle 16 is held firmly in place thereon.

The valve member 24 is further provided with a transverse feed hold 34 which communicates with the longitudinal bore 28. With the valve member 24 in the illustrated position, the hole 34 is aligned with a hole 36 in the valve body 20 through which the parison expending fluid as well as the liquid coolant are supplied.

As described hereinabove, the needle 16 and thus the valve member 24 to which it is affixed reciprocates back and forth through the bore 22 in the valve body 20 during a complete blow molding cycle. To this end, the rear end of the valve member 24 is provided with a longitudinally extending blind hole 38 which slidably receives a guide rod 40 fixed to a plug 42. As shown, the plug 42 is tightly fitted in the end of a tubular tail piece 44 which is secured to the valve housing 20 by a suitable threaded fitting 46. The rear end of the valve member 24 is press fitted into a piston-like sealing member 48 which is provided with a pair of annular grooves receiving suitable annular sealing gaskets 50 and 52.

When pressurized fluid is applied through a fitting 54 on the plug 42, it passes through a suitable hole in the plug 42 to the right side of the piston 48 to force it and the valve rod 24 to the leftward position as viewed in FIG. 1. Similarly, when pressurized fluid is supplied through a fitting 56 and drilled holes 58 to the left side of the piston 48, the piston 48 together with the valve rod 24 move to the right until the right-hand end of the piston 48 engages the plug 42. In this latter position, the needle 16 has been withdrawn completely from the molded article although it still remains within the mold part 11.

In order to reciprocate the valve rod 24 during the molding operation, a four-way valve 60 driven by a timer 62 is connected between a source 64 of pressurized air, such for example as shop air, and a pair of lines 66 and 68 which respectively connect between the valve 60 and the fittings 54 and 56. A vent line 70 is also connected to the valve 60. Therefore, in one position of the valve 60 the source of air is connected to the line 66 while the vent 70 is connected to the line 68, and in the other position the source of air is connected to the line 68 while the vent 70 is connected to the line 66. It may thus be seen that the valve rod 24 and the needle 16 move back and forth within the valve body 20 between a forward injecting position wherein the needle 16 extends into the mold cavity and the passageway 34 is aligned with the passageway 36, and a retracted position wherein the needle 16 is withdrawn from the mold cavity and the passageway 34 is out of alignment with the passageway 36. In this latter position, the valve rod 24 closes over the rear end of the passageway 36.

In order to supply the pressurized gas and liquid to the hole 36 from which it is controllably fed to the mold cavity, a tubular fitting 74 is threaded into a counterbore in the hole 36 and a T-fitting 76 is threaded to the other end thereof. A threaded fitting 78 connects a line 80 to the T-fitting and a fitting 82 connects another line 84 to the T-fitting. The line 80 supplies the gas which is used to expand the parison within the mold cavity and to control the supply of liquid $CO_2$ to the mold cavity. Accordingly, the line 80 connects to the top of a carbon dioxide tank or reservoir 86 and includes a pressure regulating valve 88 which reduces the pressure to an adjustable predetermined level and a check valve 90 which prevents the reverse flow of fluid in the line 80.

In order to meter the liquid carbon dioxide which is supplied to the mold cavity, a washerlike disk 92 having a small accurately dimensioned orifice 94 therein is mounted in the T-fitting 76 and is held in place by the fitting 82. The tube 84, which is preferably plastic and may be formed of Teflon, is connected by a suitable fitting 96 to a carbon dioxide loop 98 through which liquid carbon dioxide is continually pumped at a predetermined pressure by means of a pump 100 connected in the loop.

OPERATION

A typical blow molding operation begins with the valve rod 24 and the needle 16 withdrawn from the mold cavity and with pressure from the air source 64 connected to the left side of the piston 48 through the line 68. In this position, the valve rod 24 overlies the passageway 36 to block the flow of carbon dioxide to the needle 16. The plastic parison is then extruded, and the mold parts 10 and 11 are brought together over the parison to occupy the position illustrated in FIG. 1. During the time that the previously molded part is being removed from the mold cavity and the parison is being formed, the feeding of carbon dioxide liquid from the loop 98 and the supply of carbon dioxide vapor from the line 80 is interrupted. In order to prevent the carbon dioxide liquid from the line 84 and the carbon dioxide vapor from the line 80 from changing to the solid state within the T-fitting 76, the tube 74 and the valve 20, the pressure in those lines must be maintained above the triple point of carbon dioxide.

The triple point is that particular condition under which a substance can be present in any or all phases (gaseous, liquid, or solid). For carbon dioxide, this occurs on the Temperature-Entropy Diagram at the condition of 75 p.s.i.a and minus 70° F. By raising the pressue to say 300 p.s.i.a. the corresponding temperature of saturated liquid $CO_2$ would be 0° F. the standard storage conditions. If the pressure and temperature at the triple point were kept constant and heat were added, the carbon dioxide would turn directly to a saturated vapor. However, if the pressure were reduced below 75 p.s.i.a., the carbon dioxide would turn into a mixture of approximately 60 percent solid (dry ice) and 40 percent vapor. If heat were added, the solid carbon dioxide would turn directly into the vapor phase. This phenomenon is known as sublimation.

Since the triple point of carbon dioxide is approximately 75 p.s.i.a., the regulator 88 must be set such that the pressure downstream of the orifice 94 and upstream of the valve 24 is never less than 75 p.s.i.a. During the off duty cycle, therefore, since the tube 84 is positioned in proximity to the molding machine which is generally at an elevated temperature, the temperature of the liquid therein will rise to the point where some of its vaporizes. The extent to which the liquid will vaporize is dependent upon the length of the tube 84, its proximity to a source of heat such as the heaters of the machine, and to the time interval between the closing and opening of the valve 24. All three of these factors can be adjusted so that when the valve 24 is moved to the open position there is a predetermined length or amount of carbon dioxide vapor in the tube 84.

After the parison has been formed and the mold halves have been brought together, the timer 62 then operates the valve 60 to connect the air source 64 to the line 66 and to connect the line 66 to the vent 70 whereby the air pressure in the valve body 24 to the leftwardmost position as illustrated in the drawing wherein the valve is opened and the needle 16 pierces the wall of the hot parison. The carbon dioxide vapor which is then at about 80 lbs. p.s.i. feeds through the tube 80 and the tube 74 and through the ports 34 and 28 of the valve 24 into the needle 16 to inflate the parison against the walls of the mold cavity. At the same time that the carbon dioxide vapor is feeding through the T-fitting 76 from the line 80, carbon dioxide vapor is fed from the line 84 through the restricting orifice 94 into the T-fitting 76 where it mixes with the other carbon dioxide vapor and feeds through the needle 16 into the parison. Inasmuch as the pressure in the liquid loop 98 is at about 300 p.s.i.a., or almost four times as great as the pressure in the line 80, once the vapor in the line 84 has passed through the orifice 94 it will be followed by liquid carbon dioxide which remains in the liquid phase as it feeds through the tube 74, the hole 36, the valve ports 34 and 28, and the passageway through the needle 16 from which it enters the cavity in the molded part which has by this time been completely formed. Since, as described hereinbefore, the cavity in the molded article has been vented through the line 18, and is at a pressure below the triple point of $CO_2$, the liquid $CO_2$ quickly changes to the solid state. At this time the timer 62 operates the valve 60 to connect the air source 64 to the line 68 and to connect the line 66 to the vent 70 whereby the valve body 24 moves to the right to its closed position and the needle 16 is withdrawn from the mold cavity. The rapid chilling brought about by the injection of liquid carbon dioxide into the molded part has by this time caused the molded part to set sufficiently so that it can be withdrawn from the mold without distortion.

In this illustrated embodiment of the invention, the parison is blown by the injection therein of carbon dioxide vapor, but it will be understood that if desired dry air may be used for this purpose in place of the carbon dioxide vapor and such dry air may be used to control the flow of liquid carbon dioxide through the orifice 94. However, as in the case of the carbon dioxide vapor it must be maintained at the pressure exceeding the triple point of carbon dioxide to prevent the formation of solid carbon dioxide within the orifice 94 and the associated parts of the supply line of the valve 24.

It will be understood that the various times, temperatures, and pressures required will depend upon the particular machine with which the invention is used, the size and shape of the article being molded as well as the plastic from which the article is molded. As an example, however, a twelve-ounce beer bottle formed of polyvinylchloride has been satisfactorily blow molded in an 11-second cycle using a two-second time delay between the initial blowing of the parison and the injection of liquid carbon dioxide into the molded aritcle. Moreover, a two-second injection of the liquid carbon dioxide is sufficient to adequately cool the bottle to permit its removal from the mold without damage thus leaving an off-cycle of seven seconds during which the carbon dioxide liquid in the line 84 may vaporize. For this purpose, the tube 84 was a ⅛-inch Teflon tube approximately 18-inches long, the pressure regulator 88 was set at 80 p.s.i., and the diameter of the orifice 94 was 0.020.

Referring to FIG. 2, there is shown a multiple cavity mold 105 defining a plurality of mold cavities 106 which are fed by a single blow pin assembly 108 from which air enters the mold cavities through a plurality of flexible hoses 110. The mold 105 is cooled by means of water passing through cooling ducts 112 suitably embedded within the parts of the mold member 105. Dry air is supplied from a pressure source 114 through a reducing regulator 115 wherein the air pressure is dropped to a value approximating but exceeding the triple point of carbon dioxide. The air then passes through a solenoid controlled valve 116 and a check valve 117 to a T-fitting 118 from which it feeds through a tube 119 to the blow pin assembly 108. Carbon dioxide liquid is supplied to the fitting 118 through a solenoid controlled valve 120 from a standard liquid carbon dioxide loop 122 having a pressure of about 300 p.s.i. The solenoid valve 116 is under the control of a blow timer 124 which determines the time during the molding cycle when the pressurized air is supplied to the blow pin assembly 108 to expand the parisons. When the valve 116 is opened to inflate the parisons the timer 124 initiates operation of a carbon dioxide delay timer 126 which after a predetermined time opens the valve 120 whereby the loop 122 is connected through a restricting orifice 128 to the T-fitting 118 whereby carbon dioxide liquid is carried by the air to the blow pin assembly 108 from which it is injected into the cavities in the freshly molded parts. The length of time during which the liquid carbon dioxide is injected into the parts is controlled by an injection timer 130 which is actuated when the timer 126 energizes the solenoid valve 120 and which times out a predetermined time such, for example, as two seconds whereupon it closes the solenoid valve 120. It will be apparent that since the pressure in the T-fitting 118 is maintained above the triple point of carbon dioxide, the liquid carbon dioxide does not solidify. The time, at which the change of phase from the liquid to the solid state of the carbon dioxide actually occurs, is controlled by a variable pressure relief valve 132 in a timer controlled solenoid dump valve 134. If desired, the flow of the liquid carbon dioxide through the restricted orifice 128 may be controlled by the delaying action of vaporized carbon dioxide gas, as described herein in connection with FIG. 1, or by the conventional solenoid control valve 14 and the two timers 126 and 130 as shown in FIG. 2. It will be seen, however, that in many cases a substantial savings in the initial and operating costs can be achieved by elimination of the valve 120 and the two timers 126 and 130 by replacing the same with a simple flexible tube of the proper length whereby the same valve which controls the supply of air to the blow pin assembly also controls the supply of liquid carbon dioxide as described in connection with FIG. 1.

During the injection or compression molding of certain plastic parts, the limiting factor in controlling the total cycle time is the length of time necessary to remove heat from the freshly molded plastic part in order to partially set it and prevent its distortion after removal from the mold. With reference to FIG. 3, a pair of molds 140 and 141 define therebetween a mold cavity 142 in which an article 143 is injection molded or compression molded. The mold members 140 and 141 are cooled by circulating water through passageways therein. It is sometimes desirable, however, to selectively cool small portions of the mold or to have one side of the mold cavity remain warmer than the other in order to allow plastic flow over a larger area or to prevent internal stresses from setting up during the injection or compression cycle. In accordance with the present invention, rapid and localized cooling can be achieved by supplying a precisely metered quantity of liquid carbon dioxide to a passageway 145 in the mold member 141. At the time the rapid and localized cooling is desired, a vapor timer 147 opens a solenoid valve 148 which supplies carbon dioxide vapor at a pressure at about 80 p.s.i. from a pressure regulator 150 through a check valve 152 to the downstream side of a small orifice 154 as well as the cooling chamber 145 in the mold 141. When the pressure at the downstream side of the restricted orifice 154 at a value exceeds the triple point of carbon dioxide, operation of a $CO_2$ timer 156 is initiated by a pressure switch 157 to open a solenoid valve 158 whereby liquid dioxide is fed through the orifice 154 and is carried by the $CO_2$ vapor into the cooling chamber 145 wherein it changes phase and later sublimates to absorb heat from the mold at the location of the chamber 145. After the timer 156 times out a preset time interval as required for the particular part being molded and the desired localized cooling, the valve 158 is closed.

A solenoid operated valve 162 connects the chamber 145 to the atmosphere and is controlled by a dump timer 164 which opens the valve 162 so that the pressure in the chamber is at about atmospheric pressure and the liquid $CO_2$, which was fed thereto, flashes to the solid state at a temperature of minus 110° F. As a safety precaution, a pressure relief valve 166 is provided and as an added safety feature a pressure sensitive switch 168 is connected to the discharge side of the cooling chamber 145 and by-passes the dump timer to open the dump valve 162 at pressures in excess of about 300 p.s.i.a.

It may thus be seen that in a system of FIG. 3 the restricted orifice 154 meters the liquid carbon dioxide into the vapor stream which carries it to the area of use which is above the triple point pressure until the valve 162 opens, whereupon the liquid carbon dioxide flashes to the solid state to rapidly cool the workpiece. In this system it may be seen that the vapor pressure from the carbon dioxide tank, as reducibly controlled by the regulator 150, controls the flow of liquid carbon dioxide to the area of use and no additional source of pressurized gas such as shop air is required in this system.

While the present invention has been described in connection with a particular embodiment thereof it will be understood that many changes and modifications may be made without departing from the true spirit and the scope of the present invention. It is intended, therefore, to cover all such changes and modifications in the appended claims.

What is claimed is:

1. A method of metering the flow of a liquid carbon dioxide to a use area at which said liquid is permitted to volatize, comprising the steps of
providing a restrictive metering orifice in the supply line between a source of liquid carbon dioxide and the use area, and
connecting a source of pressurized gas to the downstream side of said orifice or maintain the pressure at said orifice above the triple point of carbon dioxide.

2. A method as set forth in claim 1 further comprising the steps of
interrupting the flow of said gas and said liquid to said area by closing said line downstream of said orifice,
vaporizing some of said liquid carbon dioxide in said supply line upstream of said orifice, and
thereafter opening said line downstream of said orifice,
whereby said liquid carbon dioxide is supplied to said use area after a predetermined time interval dependent on the size of said orifice and the amount of vapor upstream of said orifice.

3. A method as set forth in claim 1 wherein said pressurized gas is carbon dioxide.

4. A method as set forth in claim 3 wherein said liquid upstream of said orifice is at a pressure several times greater than the pressure of said gas connected to said line.

5. A system for controlling the flow of liquid carbon dioxide from a high pressure source wherein said liquid is maintained in the liquid phase and a low pressure use area where said liquid is permitted to vaporize, comprising
a pressurized tank containing said liquid,
a supply line connected between said tank and said use area,
a valve connected in said line,
means having a small metering orifice therein connected in said line upstream of said valve,
another line connected between a location in said supply line downstream of said orifice and a source of gas at a pressure substantially less than that in said tank but greater than the triple point of said liquid, and
a check valve in said another line to prevent the flow of liquid to said source of gas.

6. A system according to claim 5 wherein
said supply line includes a length of flexible plastic tubing immediately adjacent to and upstream of said orifice and wherein a quantity of the liquid carbon dioxide is vaporized when said valve is closed to interrupt the flow of liquid carbon dioxide to said area of use.

7. A system according to claim 5 wherein
said source of gas includes said pressurized tank and a pressure reducer, and
said gas is carbon dioxide.

8. A system according to claim 7 wherein
said supply line downstream of said valve is a single tube through which both said gas and said liquid pass.

* * * * *

UNITED STATES PATENT OFFICE
CERTIFICATE OF CORRECTION

Patent No. 3,760,599          Dated September 25, 1973

Inventor(s)    ROBERT N. BOSE                    Page 1 of 4

It is certified that error appears in the above-identified patent and that said Letters Patent are hereby corrected as shown below:

The claims 1 through 8 should be replaced with the following seven claims -

1. A method of metering the flow of liquid carbon dioxide to a use area at which said liquid is permitted to volatize, comprising the steps of providing a supply line between a source of liquid carbon dioxide and said area, providing a continuously open restrictive metering orifice in said supply line to control the flow rate of carbon dioxide to said use area, providing a control valve downstream of said metering orifice, and connecting a source of pressurized gas to said supply line between said metering orifice and said control valve to maintain the pressure at said open orifice above the triple point of carbon dioxide.

CERTIFICATE OF CORRECTION - continued -
3,760,599

2. A method as set forth in claim 1 comprising the further steps of interrupting the flow of carbon dioxide through said orifice to said use area, then vaporizing the carbon dioxide in a predetermined length of said supply line immediately upstream of said open orifice, and thereafter commencing the flow of carbon dioxide through said orifice to said use area, whereby carbon dioxide gas is initially supplied to said use area for a predetermined time interval followed by liquid carbon dioxide.

3. A method as set forth in claim 1 wherein said liquid carbon dioxide upstream of said orifice is at a pressure several times greater than the pressure of said gas connected to said line downstream of said orifice.

4. A system for controlling the flow of liquid carbon dioxide from a high pressure source wherein said carbon dioxide is maintained in the liquid phase to a low pressure use area where said liquid is permitted to vaporize, comprising a pressurized tank containing said liquid carbon dioxide, a supply line connected between said tank and said area, a continuously open restrictive metering orifice connected in said supply line for controlling the rate of flow of carbon dioxide to said use area, a control valve connected downstream of said metering orifice for controlling the flow of carbon dioxide to said use area, and means separate from said supply line connecting a source of pressurized gas between said metering orifice and said control valve to maintain the pressure at said orifice above the triple point of carbon dioxide.

5. A system according to claim 4 wherein said means comprises a line connected from said tank to said location downstream of said orifice, and a pressure reducing valve and a check valve in said last named line.

CERTIFICATE OF CORRECTION
3,760,599

6. A system according to claim 4, further comprising vaporizing means connected in said supply line for vaporizing the carbon dioxide in a predetermined length of said supply line immediately upstream of said metering orifice.

7. A system according to claim 6, wherein said vaporizing means comprises a length of flexible plastic tubing.

Signed and Sealed this tenth Day of February 1976

[SEAL]

Attest:

RUTH C. MASON
Attesting Officer

C. MARSHALL DANN
Commissioner of Patents and Trademarks